United States Patent [19]

Wittekind et al.

[11] 3,905,992

[45] Sept. 16, 1975

[54] N,N'-ALKYLENEBIS[2-AMINO-1-(2-IMIDAZOLIN-2-YL)-2-IMIDAZOLINES]

[75] Inventors: Raymond R. Wittekind, Morristown; John Shavel, Jr., Mendham, both of N.J.

[73] Assignee: Warner-Lambert Company, Morris Plains, N.J.

[22] Filed: Sept. 11, 1973

[21] Appl. No.: 396,166

[52] U.S. Cl.............................. 260/309.6; 424/273
[51] Int. Cl.²........................................ C07G 49/34
[58] Field of Search.................................. 260/309.6

[56] References Cited
UNITED STATES PATENTS

| | | | |
|---|---|---|---|
| 3,666,767 | 5/1972 | Wittekind et al. | 260/296 R |
| 3,798,232 | 3/1974 | Wittekind et al. | 260/309.6 |
| 3,803,157 | 4/1974 | Wittekind et al. | 260/296 R |
| 3,806,518 | 4/1974 | Wittekind et al. | 260/309.6 |
| 3,840,554 | 10/1974 | Wittekind et al. | 260/309.6 |

*Primary Examiner*—Ethel G. Love
*Attorney, Agent, or Firm*—Albert H. Graddis; Frank S. Chow

[57] ABSTRACT

The present invention relates to N,N'-alkylenebis[2-amino-1-(2-imidazolin-2-yl)-2-imidazolines] of formula I:

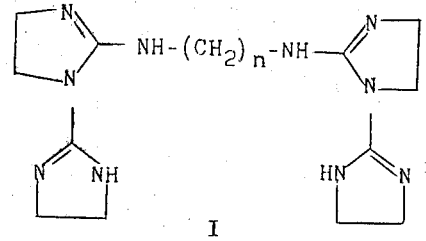

wherein $n$ is an integer from 4 to 12 and processes for the production thereof.

The compounds of this invention are useful as hypotensive agents.

8 Claims, No Drawings

N,N'-ALKYLENEBIS(2-AMINO-1-(2-IMIDAZOLIN-2-YL)-2-IMIDAZOLINES)

The present invention relates to N,N'-alkylenebis[2-amino-1-(2-imidazolin-2-yl)-2-imidazolines] having the structural formula I:

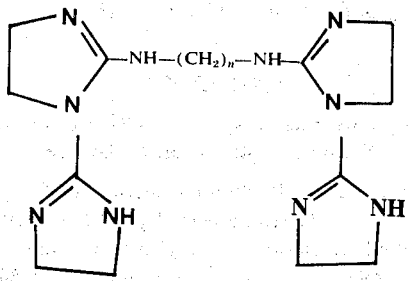

I wherein $n$ is an integer from 4 to 12.

According to the processes of this invention, the compounds of the invention are prepared by the methods outlined schematically as follows:

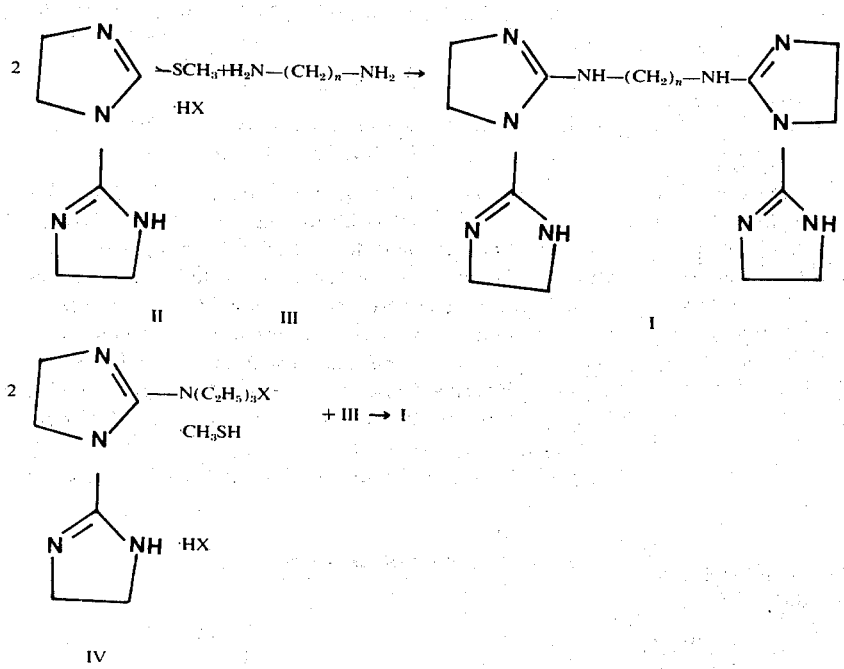

In the above and subsequent formulas of the specification, X refers to pharmaceutically acceptable anions such as chloride, bromide, iodide or nitrate and the like.

Generally, in the processes of the invention, the reactants, α, ω-diaminoalkanes (III) and 1-(2-imidazolin-2-yl)-2-(methylthio)-2-imidazoline hydroiodide (II) or triethyl[1-(2-imidazolin-2-yl)-2-imidazolin-2-yl]ammonium iodide hydroiodide methanethiol (IV), are heated under reflux in an appropriate solvent, such as 2-propanol or acetonitrile, for 18 to 24 hours under an inert atmosphere, for example, a blanket of nitrogen. The bis(imidazolin-2-yl)-2-imidazolines I are isolated as the HX salts by direct precipitation from the reaction mixture cooled to room temperature or alternatively, by evaporation of the reaction medium followed by crystallization of the residue. The reaction products are purified by recrystallization techniques well known to the art.

The starting α,ω-diaminoalkanes III are known compounds, commercially available from chemical suppliers such as the Aldrich Chemical Company. The diamines III are also readily prepared by methods described in Synthetic Organic Chemistry by R. B. Wagner and H. D. Zook, John Wiley and Sons, Inc., New York, New York, 1953, page 653.

The methylthio precursors, triethyl[1-(2-imidazolin-2-yl)-2-imidazolin-2-yl]ammonium iodide hydroiodide methanethiol (IV) and 1-(2-imidazolin-2-yl)-2-(methylthio)-2-imidazoline hydroiodide (II) are prepared by methods described in U.S. Pat. No. 3,666,770, issued May 20, 1972.

The compounds of the present invention may be formulated with various excipients, such as water, saline, polyalkylene glycol, gum tragacanth and the like into solutions and suspensions, and with lactose, starch, gelatin and the like into tablets, powders, capsules and the like for oral and parenteral administration. The procedures by which these dosage forms are prepared are well known in the pharmacist's art.

The N,N'-alkylenebis[2-amino-1-(2-imidazolin-2-yl)-2-imidazolines] (I) exhibit hypotensive activity at a dose of 1–10 mg/kg of body weight in the artifically respired, anesthetized, vagotomized dog.

The following examples further illustrate the practices of the invention:

EXAMPLE 1

N,N'-Tetramethylenebis[2-amino-1-(2-imidazolin-2-yl)-2-imidazoline] dihydroiodide.

A solution of 1,4-diaminobutane (2.65 g, 3.0 mmol), triethyl[1-(2-imidazolin-2-yl)-2-imidazolin-2-yl]ammonium iodide hydriodide methanethiol (35.5 g, 6.0 mmole) and 2-propanol (130 ml) was heated under reflux for 3.5 hours while a stream of nitrogen was bubbled through the reaction mixture. The reaction mixture was allowed to cool to room temperature and the precipitate was collected. Recrystallization from 70% aqueous ethanol gave 5.68 g (31%) of the bisimidazoline, mp 267°–268°C dec.

Anal. Calcd for $C_{16}H_{30}I_2N_{10}$: C, 31.18; H, 4.90; I, 41.18; N, 22.73. Found: C, 31.30; H, 4.99; I, 41.12; N, 22.86.

EXAMPLE 2

N,N′-Pentamethylenebis[2-amino-1-(2-imidazolin-2-yl)-2-imidazoline] dihydroiodide.

A solution of 1,5-diaminopentane (10.2 g, 0.1 mol), 1,-(2-imidazoline-2-yl)-2-(methylthio)-2-imidazoline hydroiodide (62.4 g, 0.2 mol) and acetonitrile (500 ml) was heated under reflux for 24 hours while a steady stream of nitrogen was bubbled through the mixture. The reaction mixture was allowed to cool to room temperature and the precipitate was collected. Recrystallization from methanol-ether (1:1) gave 54.2 g (32%) of the bis-imidazoline, mp 250°–252°C dec.

Anal. Calcd for $C_{17}H_{32}I_2N_{10}$: C, 32:39; H, 5.12; I, 40.27; N, 22.22. Found: C, 32.35; H, 5.30; I, 40.39; N, 22.24.

EXAMPLE 3

N,N′-Hexamethylenebis[2-amino-1-(2-imidazolin-2-yl)-2-imidazoline] dihydroiodide.

A solution of 1,6-diaminohexane (11.6g, 0.1 mol), 1-(2-imidazolin-2-yl)-2-(methylthio-2-imidazoline hydroiodide (62.4 g, 0.2 mol) and acetonitrile (1 l.) was heated under reflux for 20 hours during which time a steady stream of nitrogen was passed through the reaction mixture. The reaction mixture was allowed to cool to room temperature and the precipitate was collected. Recrystallization from methanol-ether (8:5) gave 35.6 g (55 percent) of the bis-imidazoline, mp 230°–231°C dec.

Anal. Calcd for $C_{18}H_{34}I_2N_{10}$: C, 33.55; H, 5.32; I, 39.39; N, 21.74. Found: C, 33.26; H, 5.52; I, 39.62; N, 21.92.

EXAMPLE 4

N,N′-Heptamethylenebis[2-amino-1-(2-imidazolin-2-yl)-2-imidazoline] dihydroiodide.

A solution of 1,7-diaminoheptane (3.9 g, 0.03 mol), 1-(2-imidazolin-2-yl)-2-(methylthio)-2-imidazoline hydroiodide (18.7 g, 0.06 mol) and acetonitrile (150 ml) was heated under reflux for 24 hours while a rapid stream of nitrogen was passed through the reaction mixture. The reaction mixture was allowed to cool to room temperature and the precipitate was collected. Recrystallization from methanol gave 11.2 g (57 percent) of the bis-imidazoline, mp 234°–236°C dec.

Anal. Calcd. for $C_{19}H_{36}I_2N_{10}$: C, 34.66; H, 5.51; I, 38.55; N, 21.37. Found: C, 34.45; H, 5.62; I, 38.57; N, 21.23.

EXAMPLE 5

N,N′-Octamethylenebis[2-amino-1-(2-imidazolin-2-yl)-2-imidazoline] dihydroiodide.

A solution of 1,8-diaminooctane (3,58 g, 0.025 mol), 1-(2-imidazolin-2-yl)-2-(methylthio-2-imidazoline hydroiodide (16.7 g, 0.05 mol) and acetonitrile (150 ml) was heated under reflux for 24 hours while a stream of nitrogen was passed through the reaction mixture. The reaction mixture was allowed to cool to room temperature. The precipitate was collected. Recrystallization from methanolether (1:1) gave 10.0 g (56 percent) of the bis-imidazoline, mp 257°–259°C dec.

Anal. Calcd for $C_{20}H_{38}I_2N_{10}$: C, 35.73; H, 5.70; I, 37.75; N, 20.83. Found: C, 35.47; H, 5.67; I, 37.69; N, 21.02.

EXAMPLE 6

N,N′-Decamethylenebis[2-amino-1-(2-imidazolin-2-yl)-2-imidazoline] dihydroiodide.

A solution of 1,10-diaminodecane (8.82 g, 0.05 mol), 1-(2-imidazolin-2-yl)-2-(methylthio)-2-imidazoline hydroiodide (31.2 g, 0.1 mol) and acetonitrile (500 ml) was heated under reflux for 24 hours while a stream of nitrogen was passed through the reaction mixture. The reaction mixture was allowed to cool to room temperature and the precipitate was collected. Recrystallization from ethanolether (1.5:1) gave 20.0 g (57 percent) of the bis-imidazoline, mp 232°–236°C dec.

Anal. Calcd for $C_{22}H_{42}I_2N_{10}$: C, 37.72; H, 6.04; I, 36.23; N, 20.00. Found: C, 37.63; H, 6.17; I, 36.00; N, 20.00.

EXAMPLE 7

N,N′-Dodecamethylenebis[2-amino-1-(2-imidazolin-2-yl)-2-imidazoline] dihydroiodide.

A solution of 1,12-diaminododecane (20.0 g, 0.01 mol), 1,-(2-imidazolin-2-yl)-2-(methylthio)-2-imidazoline hydroiodide (6.24 g, 0.02 mol) and acetonitrile (50 ml) was heated under reflux for 18 hours while a stream of nitrogen was passed through the reaction mixture. The reaction mixture was evaporated. Trituration of the residual oil with ethanol followed by recrystallization from ethanolether (1:2) gave 0.95 g (13 percent) of the bis-imidazoline, mp 97°–99°C dec.

Anal. Calcd for $C_{24}H_{46}I_2N_{10}$: C, 39.57; H, 6.36; I, 34.84; N, 19.23. Found: C, 39.41; H, 6.39; I, 34.99; N, 19.20.

We claim:
1. A compound of the formula:

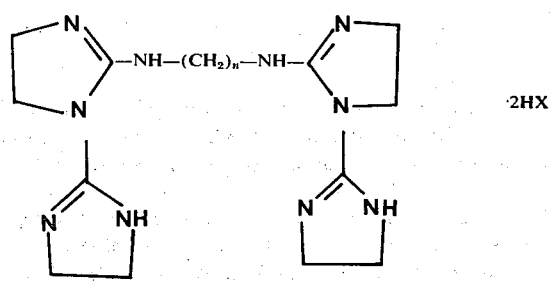

wherein $n$ is an integer from 4 to 12 and X is the pharmaceutically acceptable iodide ion.

2. A compound according to claim 1 which is N,N′-tetramethylenebis[2-amino-1-(2-imidazolin-2-yl)-2-imidazoline] dihydroiodide.

3. A compound according to claim 1 which is N,N′-pentamethylenebis[2-amino-1-(2-imidazolin-2-yl)-2-imidazoline] dihydroiodide.

4. A compound according to claim 1 which is N,N'-hexamethylenebis[2-amino-1-(2-imidazolin-2-yl)-2-imidazoline] dihydroiodide.

5. A compound according to claim 1 which is N,N'-heptamethylenebis[2-amino-1-(2-imidazolin-2-yl)-2-imidazoline] dihydroiodide.

6. A compound according to claim 1 which is N,N'-octamethylenebis[2-amino-1-(2-imidazoline-2-yl)-2-imidazoline] dihydroiodide.

7. A compound according to claim 1 which is N,N'-decamethylenebis[2-amino-1-(2-imidazoline-2-yl)-2-imidazoline] dihydroiodide.

8. A compound according to claim 1 which is N,N'-dodecamethylenebis[1-amino-1-(2-imidazolin-2-yl)-2-imidazoline] dihydroiodide.

* * * * *